(12) United States Patent
Bererton et al.

(10) Patent No.: US 7,899,772 B1
(45) Date of Patent: *Mar. 1, 2011

(54) METHOD AND SYSTEM FOR TUNING MOTION RECOGNIZERS BY A USER USING A SET OF MOTION SIGNALS

(75) Inventors: Curt Bererton, Burlingame, CA (US); Daniel Dobson, Atherton, CA (US); John Funge, Sunnyvale, CA (US); Charles Musick, Jr., Belmont, CA (US); Stuart Reynolds, Mountain View, CA (US); Xiaoyuan Tu, Sunnyvale, CA (US); Ian Wright, Sunnyvale, CA (US); Wei Yen, Seattle, WA (US)

(73) Assignee: AiLive, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,397

(22) Filed: Mar. 2, 2010

Related U.S. Application Data

(63) Continuation of application No. 11/486,997, filed on Jul. 14, 2006, now Pat. No. 7,702,608.

(51) Int. Cl.
*G06F 17/00* (2006.01)
*G06F 19/00* (2006.01)
*G06N 5/02* (2006.01)
*A63F 9/24* (2006.01)
*A63F 13/00* (2006.01)

(52) U.S. Cl. ............................................. 706/46; 463/37
(58) Field of Classification Search .................. 706/46
See application file for complete search history.

(56) References Cited

U.S. PATENT DOCUMENTS

| 6,249,606 | B1 | 6/2001 | Kiraly et al. |
| 7,421,369 | B2 | 9/2008 | Clarkson |
| 7,519,223 | B2 | 4/2009 | Dehlin et al. |
| 7,580,572 | B2 | 8/2009 | Bang et al. |
| 7,702,608 | B1 | 4/2010 | Bererton et al. |
| 7,770,136 | B2 | 8/2010 | Beeck et al. |
| 7,774,155 | B2 | 8/2010 | Sato et al. |
| 2004/0030531 | A1 | 2/2004 | Miller et al. |
| 2005/0215322 | A1 | 9/2005 | Himoto et al. |
| 2005/0219213 | A1 | 10/2005 | Cho et al. |

(Continued)

FOREIGN PATENT DOCUMENTS

EP   1834680 A2   9/2007

(Continued)

OTHER PUBLICATIONS

E. Keogh and M. Pazzani, Derivative Dynamic Time Warping, in First SIAM International Conference on Data Mining, (Chicago, IL, 2001).

(Continued)

*Primary Examiner* — Donald Sparks
*Assistant Examiner* — Ben M Rifkin
(74) *Attorney, Agent, or Firm* — Joe Zheng

(57) ABSTRACT

Techniques for using motion recognizers are described. The motion recognizers are created or generated in advance by trained users. The motion recognizers are then loaded into a processing unit that receives motion signals from one or more motion sensitive devices being manipulated by one or more end users to control one or more objects in a virtual environment. Depending on implementation, the virtual environment may represent a remote scene or a video game, where objects in the virtual environment can be controlled by the users to perform desired actions or moves.

36 Claims, 6 Drawing Sheets

Overview.

U.S. PATENT DOCUMENTS

| | | | |
|---|---|---|---|
| 2006/0071904 | A1 | 4/2006 | Cho et al. |
| 2006/0279549 | A1 | 12/2006 | Zhang et al. |
| 2006/0287084 | A1 | 12/2006 | Mao et al. |
| 2009/0066641 | A1 | 3/2009 | Mahajan et al. |
| 2009/0143141 | A1 | 6/2009 | Wells et al. |
| 2009/0149257 | A1 | 6/2009 | Ferguson et al. |
| 2009/0209343 | A1 | 8/2009 | Foxlin et al. |
| 2009/0258703 | A1 | 10/2009 | Brunstetter |
| 2009/0265671 | A1 | 10/2009 | Sachs et al. |
| 2009/0273559 | A1 | 11/2009 | Rofougaran et al. |
| 2009/0291759 | A1 | 11/2009 | Cox et al. |
| 2010/0035688 | A1 | 2/2010 | Picunko |
| 2010/0079447 | A1 | 4/2010 | Williams |
| 2010/0088061 | A1 | 4/2010 | Horodezky et al. |
| 2010/0117959 | A1 | 5/2010 | Hong et al. |
| 2010/0171696 | A1 | 7/2010 | Wu |
| 2010/0201616 | A1 | 8/2010 | Choi et al. |

FOREIGN PATENT DOCUMENTS

| | | |
|---|---|---|
| EP | 2090346 A1 | 8/2009 |
| GB | 2423808 | 9/2006 |
| JP | 11253656 | 9/1999 |
| WO | WO2006/090197 | 8/2006 |
| WO | WO2006/128093 | 11/2006 |

OTHER PUBLICATIONS

Lawrence R. Rabiner, A Tutorial on Hidden Markov Models and Selected Applications in Speech Recognition. Proceedings of the IEEE, 77 (2), p. 257-286, Feb. 1989.

"*Radar, Sonar, Navigation & Avionics Strapdown Inertial Navigation Technology, $2^{nd}$ Edition*", by D. Titterton and J. Weston.

"*Design and Error Analysis of Accelerometer-Based Inertial Navigation Systems*", Chin-Woo Tan et al., Published in Jun. 2002 by the University of California at Berkeley for the State of California PATH Transit and Highway System.

R. Kjeldson and J. Kender, Towards the Use of Gesture in Traditional User Interfaces, Proceedings of the $2^{nd}$ International Conference on Automatic Face and Gesture Recognition) 1996.

D. Kwon and M. Gross, Combining Body Sensors and Visual Sensors for Motion Training, ACM SIGCHI ACE 2005.

Liqun Deng et al, "Automated Recognition of Sequential Patterns in Captured Motion Streams", WAIM 2010, LNCS 6184, pp. 250-261, 2010.

M. Roth, K. Tanaka, "Computer Vision for Interactive Computer Graphics", TR99-02 Jan. 1999, *IEEE Computer Graphics and Applications*, May-Jun. 1998, pp. 42-53.

YK Jung, et al, "*Gesture recognition based on motion inertial sensors for ubiquitous interactive game content*", IETE Technical review, vol. 27, Issue 2, Mar.-Apr. 2010.

Zhang Xu et al, "Hand Gesture Recognition and Virtual Game Control Based on 3D Accelerometer and EMG Sensors", *IUI'09*, Feb. 8-11, 2009, Sanibel Island, Florida, USA.

Greg Welch, et al, "Motion Tracking: No Silver Bullet, but a Respectable Arsenal", Motion Tracking Survey, Nov./Dec. 2002.

Axel Mulder, et al, "Human movement tracking technology", Human Movement Tracking Technology. Technical Report, NSERC Hand Centered Studies of Human Movement project, available through anonymous ftp in fas.sfu.ca:/pub/cs/graphics/vmi/HMTT.pub.ps.Z. Burnaby, B.C., Canada: Simon Fraser University.

Sven Kratz, et al, "Gesture Recognition Using Motion Estimation on Mobile Phones" *Proc PERMID 07 3rd Intl Workshop on Pervasive Mobile Interaction Devices at Pervasive 2007*.

Chuck Blanchard, et al, "Reality Built For Two: A Virtual Reality Too I" VPL Research, Inc . 656 Bair Island Road, Suite 30 4, Redwood City, CA 9406 3, I3D '90 Proceedings of the 1990 symposium on Interactive 3D graphics, © 1990 table of contents ISBN:0-89791-351-5.

NamHo Kim. et al "Gesture Recognition Based on Neural Networks for Dance Game Contents", 2009 International Conference on New Trends in Information and Service Science.

Xiaoxu Zhou, et al "Real-time Facial Expression Recognition in the Interactive Game Based on Embedded Hidden Markov Model", Proceedings of the International Conference on Computer Graphics, Imaging and Visualization (CGIV'04).

Classification.

Generating a Classifier.

Tuning a Classifier.

Typical Setup.

METHOD AND SYSTEM FOR TUNING MOTION RECOGNIZERS BY A USER USING A SET OF MOTION SIGNALS

CROSS REFERENCE TO RELATED APPLICATIONS

This is a continuation of U.S. application Ser. No. 11/486,997, entitled "Generating Motion Recognizers for Arbitrary Motions", filed Jul. 14, 2006, now U.S. Pat. No. 7,702,608.

BACKGROUND OF THE INVENTION

1. Field of the Invention

The invention relates to machine learning, especially in the context of generating motion recognizers from example motions; in some embodiments, a set of generated motion recognizers can be incorporated into end-user applications, with the effect that those applications are capable of recognizing motions.

2. Related Art

Writing program code to recognize whether a supplied motion is an example of one of an existing set of known motion classes, or motion types, can be difficult. This is because the representation of a motion can often be counter-intuitive. For example, if a motion is created with a device containing at least one accelerometer, relating the resulting data to an intuitive notion of the motion performed can be extremely difficult with known techniques. The problem is difficult because the same motion can be quite different when performed by different people, or even by the same person at different times. In addition the motion recording device might introduce measurement errors, or noise, that can make it harder to recognize a motion.

Handwriting recognition (HWR) is a special case of recognizing motions. What makes it a special case is that the set of motion classes is known in advance and all the motions are known ahead of time to be performed in a two-dimensional plane. For example, in English there are 26 lowercase letters of the alphabet that are written on a flat writing surface. Real world HWR recognition systems may include support for uppercase letters, punctuation, numerals and other gestures such as cut and paste. At least some machine learning approaches to HWR are known and widely used, but they do not solve the more general problem of generating motion recognizers in response to example motions.

At least some techniques for gesture recognition of limited symbols in computer games are also known. For example, various spell-casting games allow players to perform gestures that are recognized as invocations for particular spells. However, the set of gestures is fixed in advance by using a pre-programmed recognizer. Moreover, a movement is usually restricted to movement in a plane.

SUMMARY OF THE INVENTION

The invention provides a way for developers and users to generate motion recognizers from example motions, without substantial programming. The invention is not limited to recognizing a fixed set of well-known gestures, as developers and users can define their own particular motions. For example, developers and users could choose to give example motions for their own made-up alphabet that is unlike any known alphabet and the invention will generate a motion recognizer for that unique alphabet. The invention is also not limited to motions that occur substantially in a plane, or are substantially predefined in scope.

The invention allows a developer to generate motion recognizers by providing one or more example motions for each class of motions that must be recognized. Machine learning techniques are then used to automatically generate one or more motion recognizers from the example motions. Those motion recognizers can be incorporated into an end-user application, with the effect that when a user of the application supplies a motion, those motion recognizers will recognize the motion as an example of one of the known classes of motion. In the case that the motion is not an example of a known class of motion, those motion recognizers can collectively recognize that fact by responding that the motion is "unknown".

In another use of the invention, the ability to tune a motion recognizer can be incorporated into an end-user application. In this case, not just the application developers, but also any users of the end-user application can add their own new example motions. The recognizer can then be tuned to improve recognition rates for subsequent motions from those users.

In another use of the invention, the ability to generate or alter a motion recognizer can be incorporated into an end-user application. In this case, not just the application developers, but also any users of the end-user application can generate their own recognizers from any combination of existing motions, their own new motions, or both. When the generated motion recognizer includes elements of previous motion recognizers, or is responsive to existing motions, the newly generated motion recognizer can be thought of as an alteration or modification of the previously existing motion recognizers.

The ability for users of an application to tune or generate their own motion recognizers is an enabling technology for a wide class of applications that, while possibly previously imagined, were not feasible.

Although many potential applications of motion recognition are known, the invention is an enabling technology for a wide class of applications.

DETAILED DESCRIPTION

Generality of the Description

Figure 1:
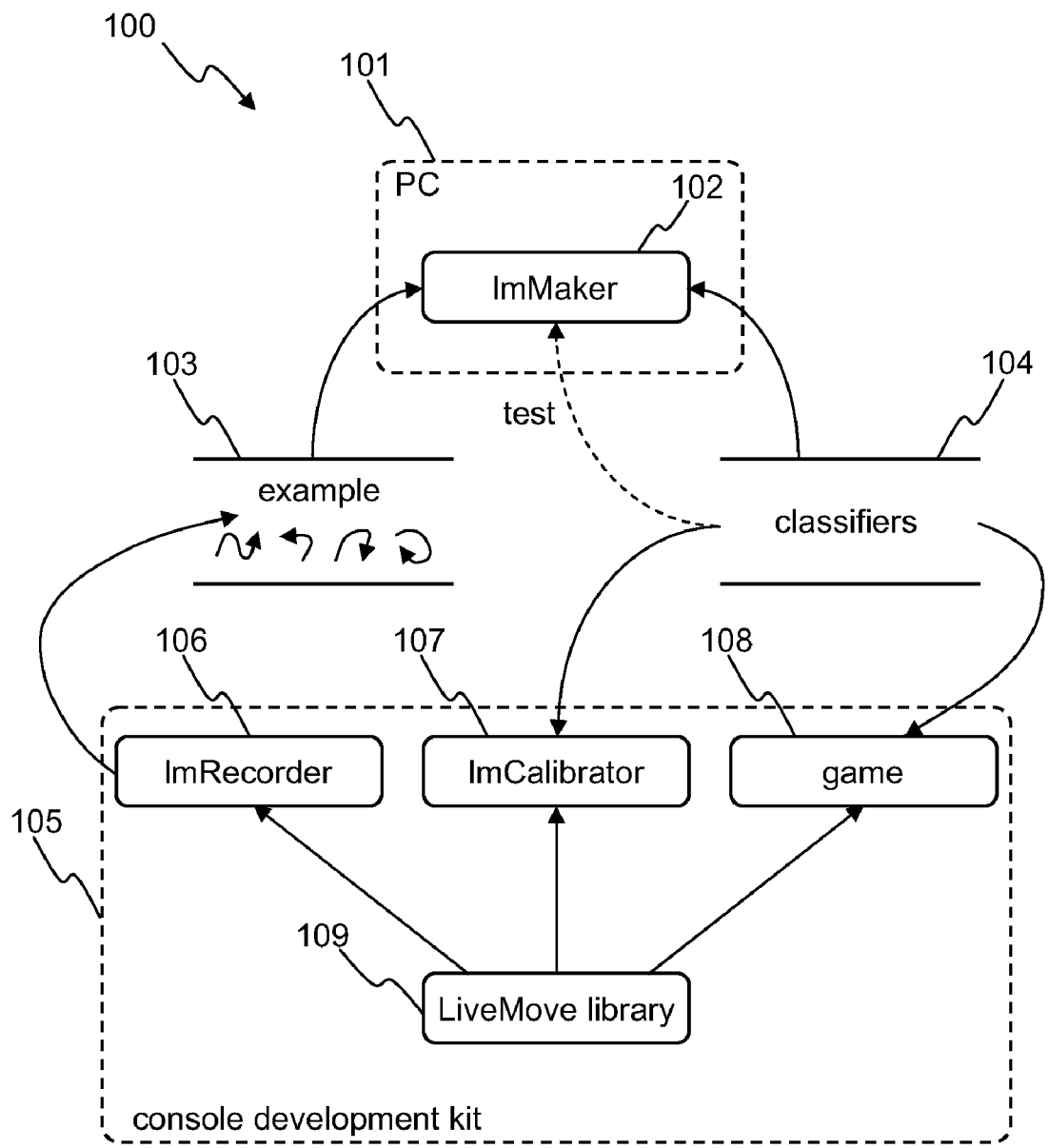
FIG. 1 shows the different components of a preferred embodiment in relation to one another.

This application should be read in the most general possible form. This includes, without limitation, the following:

References to specific structures or techniques include alternative and more general structures or techniques, especially when discussing aspects of the invention, or how the invention might be made or used.

References to "preferred" structures or techniques generally mean that the inventor(s) contemplate using those structures or techniques, and think they are best for the intended application. This does not exclude other structures or techniques for the invention, and does not mean that the preferred structures or techniques would necessarily be preferred in all circumstances.

References to first contemplated causes and effects for some implementations do not preclude other causes or effects that might occur in other implementations, even if completely contrary, where circumstances would indicate that the first contemplated causes and effects would not be as determinative of the structures or techniques to be selected for actual use.

References to first reasons for using particular structures or techniques do not preclude other reasons or other structures or techniques, even if completely contrary, where circumstances would indicate that the first reasons and structures or techniques are not as compelling. In general, the invention includes those other reasons or other structures or techniques, especially where circumstances indicate they would achieve the same effect or purpose as the first reasons or structures or techniques.

After reading this application, those skilled in the art would see the generality of this description.

Definitions

The general meaning of each of these following terms is intended to be illustrative and not in any way limiting.

Motion: The action or process of changing position. This includes intentional and meaningful motions, such as twisting ones wrist to simulate using a screwdriver, as well as unintentional motions, such as wobbling some people might exhibit when drunk.

Motion signal: A motion signal is information, such as time series data that describes some motion over a predefined time. The data can take many forms. For example, not intended to be limiting in any way, positions of an object over time, orientations of an object over time, accelerations experienced by an object over time, forces experienced by an object over time, data expressed in a frequency domain, data expressed in a parameterized domain such as $R^3$ or $R^4$, and the like. Motion signals are sometimes referred to as motions. As used herein, a motion signal might refer herein to a processed motion signal or a raw motion signal.

Processed motion signal: A processed motion signal is a motion signal that has been filtered or transformed in some way. For example, adaptively smoothing the signal or transforming the signal into a frequency domain using a Fourier or other transform. Processed motion signals are sometimes referred to herein as processed motions.

Raw motion signal: Is the unprocessed motion signal. Raw motion signals are sometimes referred to herein as motion signals.

Motion class: A motion class is a set of motions recognizable as distinct from other motion classes, such as a cluster of motions generally distinguishable from other such clusters. For example, not intended to be limiting in any way, there is a class of motions that correspond to waving. Any two waving motions could be quite different, but there is some group family resemblance that means they are both examples of the class of waving motions.

Unknown class: In any set of motion classes there is understood to be the class of "unknown" or "undetermined" motions. In these cases, the "unknown" class is used herein to refer to all motions that are not examples of one of the set of said known classes.

Motion label: A motion label includes a unique identifier for a motion class. For example, any motion that is deemed to be an example of the class of waving motions might be labeled "waving". Those skilled in the art would immediately recognize that some convenient synonym, such as an integer or enum in a programming language, could be used.

Labeled motion: A labeled motion includes a (raw or processed) motion signal that has been assigned a class label. During the training phase in which a classifier is generated, labels might be assigned by a human operator or other interface with domain knowledge of the motion signals. Labels can also be implicit in the sense that a set of motions grouped together in some way can sometimes be assumed to all examples of some motion. That is, they are implicitly labeled as positive examples of some motion that may or may not have some additional way of describing it.

Training set: A set of (raw or processed) motion signals used to generate a motion recognizer. There are a wide variety of possible forms a training set can take and many structures that a training set can have. For example, not intended to be limiting in any way, a collection of sets of motion classes, or a set of labeled motions, or a collection of unlabeled motions (implicitly assumed to be positive examples of some motion class).

Classification rate: A measure of motion recognizer performance responsive to a set of statistical measures, such as for example a number of false positives and false negatives.

Classification distance: If a set of motions is arranged in ascending order of distance to some particular motion, a classification distance for the particular motion is the distance to the first false positive in that set.

Classification: Includes assigning a class label to an unlabelled motion signal or prototype, including the possibility that the assigned class label might be "unknown", "undetermined", and the like. Classification might additionally assign probabilities, possibly in response to additional factors, that an unlabelled example is an example of each possible class, in which case the assigned label is the class with greatest likelihood.

Motion prototype: A motion prototype is a (raw or processed) motion signal that has been chosen to be a member of the set of representative motions for some class of motion signals. The number of prototypes that a motion recognizer or classifier can store is called the capacity of the motion recognizer or classifier.

Adaptive smoothing: Adaptive smoothing includes motion filtering techniques applied to a raw motion signal to generate a compressed representation, referred to herein as a processed motion signal. In a preferred embodiment, the raw motion is split into segments and each segment is represented by the average value of the signal in that segment. The length of the segment is determined adaptively according to the magnitude of the underlying raw motion signal. In some embodiments, the length of the segment is proportional the signal magnitude so that the higher the magnitude, the shorter the segment—higher magnitude signals intuitively indicate more information content and hence the need for a higher sampling rate.

Motion recognizer: software instructions capable of being interpreted by a computing device to recognize classes of motions.

Gesture: A meaningful or expressive change in the position of the body or a part of the body. For example, not intended to be limiting in any way, waving, drawing a letter of the alphabet, trying to lasso a horse. Gestures include motions, but not all motions are necessarily gestures.

Classifier: As used herein, this term generally refers to software instructions capable of being interpreted by a computing device to perform classification. A classifier might also function by assigning probabilities that the possible class instance is an example of each possible class. A classifier might also be allowed to determine that a possible class instance is, in fact, not an instance of any known class.

Tuning: As used herein, tuning a classifier involves providing additional labeled examples of pre-existing motion classes. The purpose of tuning is to improve recognition rates, for example, to reduce the number of false positives or false negatives.

Game developer: Anyone involved in the creation of a video game. As used herein, this might include, but is not necessarily limited to, a game programmer, an AI programmer, a producer, a level designer, a tester, a hired contractor, an artist, a hired motion actor, and the like.

Console: One or more devices used for playing a video game. For example, not intended to be limiting in any way, one of the following: Playstation, PlayStation 2, Playstation 3, XBox, XBox 360, GameCube, Wii, PSP, Dual Screen, PC, Mac, Game Boy, any other device, such as a cell phone, that can be used for playing games.

Console development kit (or "development kit"): A console development kit is a version of one or more game consoles used by game developers to develop their games, that is, either a version of a single game console or a version capable of emulating different game consoles. It is ostensibly the same as the final console that the game will run on, but typically has additional features to help game development, such as file input and output, hookup to an integrated development environment hosted on another computer, and the like.

Host PC (or host computer): During game development on consoles, it is customary to have a console development kit attached to a host PC. For example, the compiler might run on a PC running a version of Microsoft Windows to generate an executable. The executable then gets run on the console by transferring it across some connection, such as a USB cable, to the console. Output from the console then appears on a TV screen, with the option to have printed messages (for debugging purposes) sent back to the host PC for display.

Development time: The time during which the game is developed, that is, before it ships to end-users. However, development may even continue after shipping, with the effect that upgrades and bug fixes might be released as patches.

Game time: The time when the game is being run, that is, played by an end-user.

The scope and spirit of the invention is not limited to any of these definitions, or to specific examples mentioned therein, but is intended to include the most general concepts embodied by these and other terms.

Developer Setup

Figure 5:
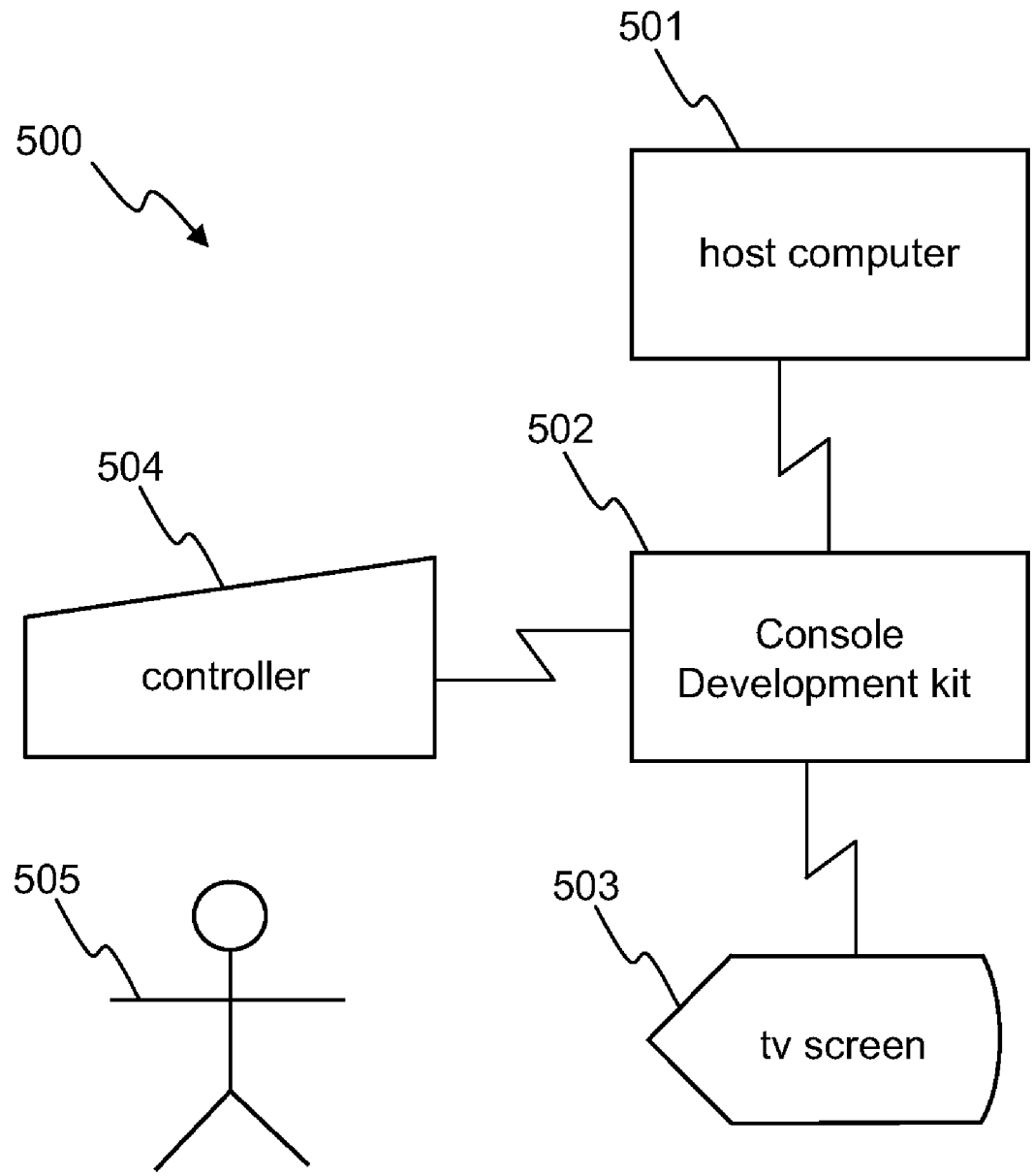
FIG. 5 shows a typical setup that a developer might use when developing a console game.

FIG. 5 shows a typical setup 500 that a developer uses when developing a console game.

The console development kit 502 is almost the same as the console that the game will run on when it is finally shipped, but may have some additional features to assist development. The term console and console development kit can therefore be largely used interchangeably. The controller 504 is connected to the console development kit 502 by a wired or wireless connection. The controller is moved around by a human 505 who may be the game developer, or someone hired by the developer. The console development kit 502 can communicate with a host computer 501 that is usually a standard PC. The console 502 is also attached to a display device, such as a TV screen 503.

System Components

FIG. 1 shows different components of a preferred embodiment 100 in relation to one another.

ImMaker 102 is an application that runs on a host PC. ImRecorder 106 and ImCalibrator 107 are distributed as sample applications that can be compiled and run on the Nintendo Wii console development kit 105. The run time library 109 will be compiled and linked in with all applications that use LiveMove on the console (i.e., the game 108, ImCalibrator 107 and ImRecorder 106).

To create motion examples 103, the game developer runs ImRecorder 106. Then, as the developer, or someone hired by the developer, performs motions with the controller, the motions are recorded and saved to a disk (or some other suitable media) as motion examples 103.

ImRecorder 106 can also provide feedback on the motions generated to help the user of the motion input device obtain the examples being desired. Thus, only when a desired motion has been performed is it saved.

It shall be noted that ImRecorder 106 can alternatively be compiled into a developer's game 108 (or some other suitable application) as a library so that the collection of raw motions can be performed within the context of the game, if the developer so desires.

Another application called ImMaker runs on the host computer. The example motions 103 can be read in by ImMaker 102 running on the host PC 101 to create classifiers 104. In particular, the developer uses ImMaker 102 to select motions and assign corresponding labels to the classifiers. In addition, ImMaker provides additional summary information on the motions. For example, which orientation the motion device was being held, etc.

Once the classifiers 104 have been generated, they can then be read straight back in to ImMaker 102 for immediate testing. This allows for a very fast prototyping to maximize game developer creativity.

The classifiers 104 can also be loaded by console applications, such as the game 108 or ImCalibrator 107. On the console 105, the classifiers 104 can be used by the LiveMove library 109 to classify new motions. They can also be tuned to improve their performance, which will be further detailed below with reference to FIG. 4.

Classifying New Motions

Figure 2:
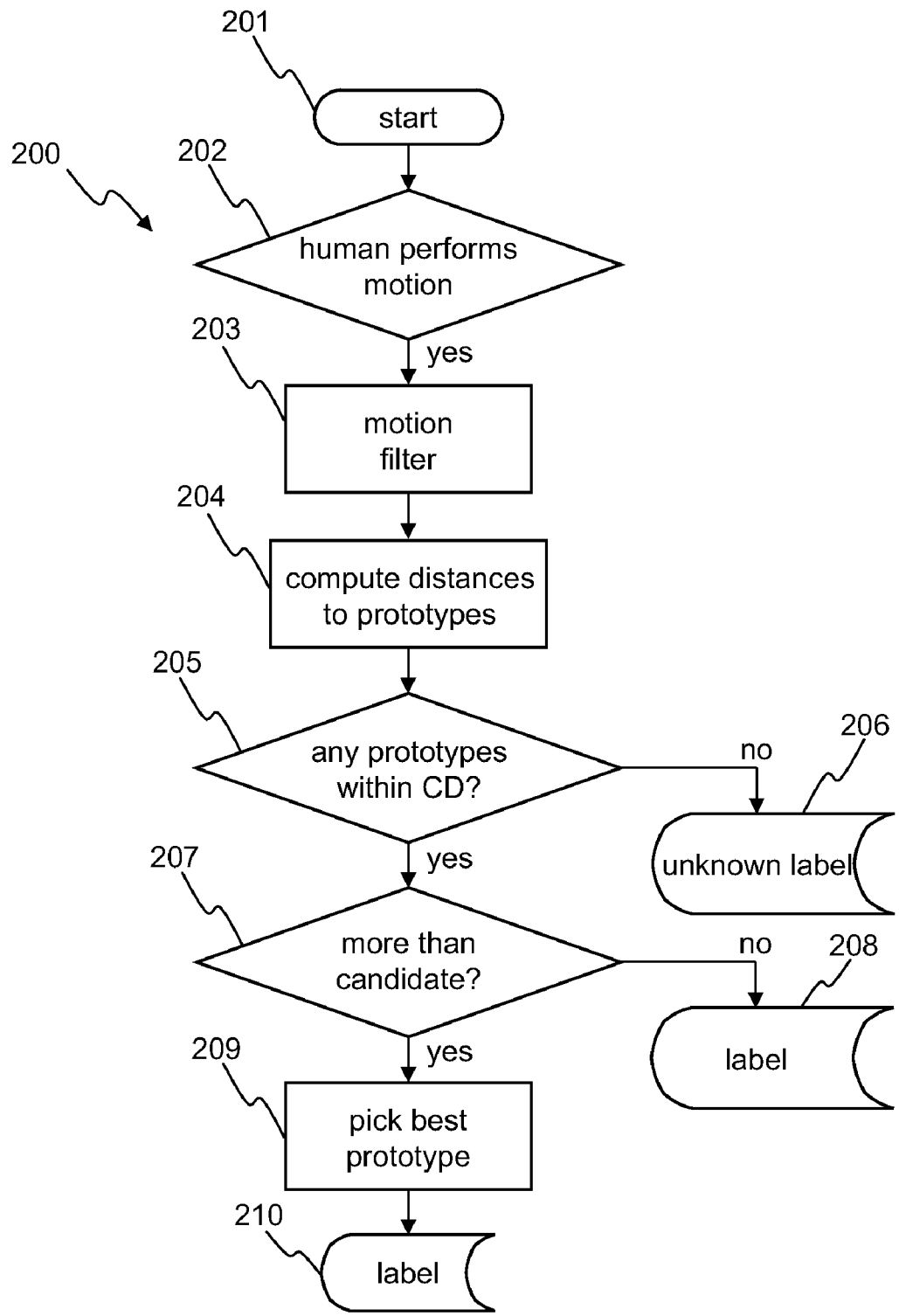
FIG. 2 shows a process of classifying a new motion.

FIG. 2 shows a process 200 of classifying a new motion 202.

The raw motion signal is possibly filtered 203, for example, using adaptive smoothing, and then the time warp distance to the prototypes 204 stored in the classifier is computed. If no prototypes are within any prototype's classification distance 205, then the motion 202 is labeled as unknown or undetermined 206. If there is only one prototype for which the motion 202 is within the prototype's classification distance, then the motion 202 is labeled with the label associated with the said prototype. If there is more than one candidate prototype 207, then the best prototype used to assign the label 210 is picked by majority vote, or is the one with the smallest distance 209. The game can use the label determined by the classifier to drive an animation, change the game-state, etc, Those skilled in the art would recognize that generated classifiers motion can be arranged in a hierarchy. For example, one set of classifiers may determine if a motion was a punch. Then, if additional information was required, a second set of classifiers could be called upon to determine if the punch was, say, an uppercut or a jab. This might be useful if there were circumstances in the game in which it was only necessary to determine the broad class of motion. In such cases, the additional work of determining more fine-grained information about the motion could be avoided.

Methods of Operation

Figure 3:
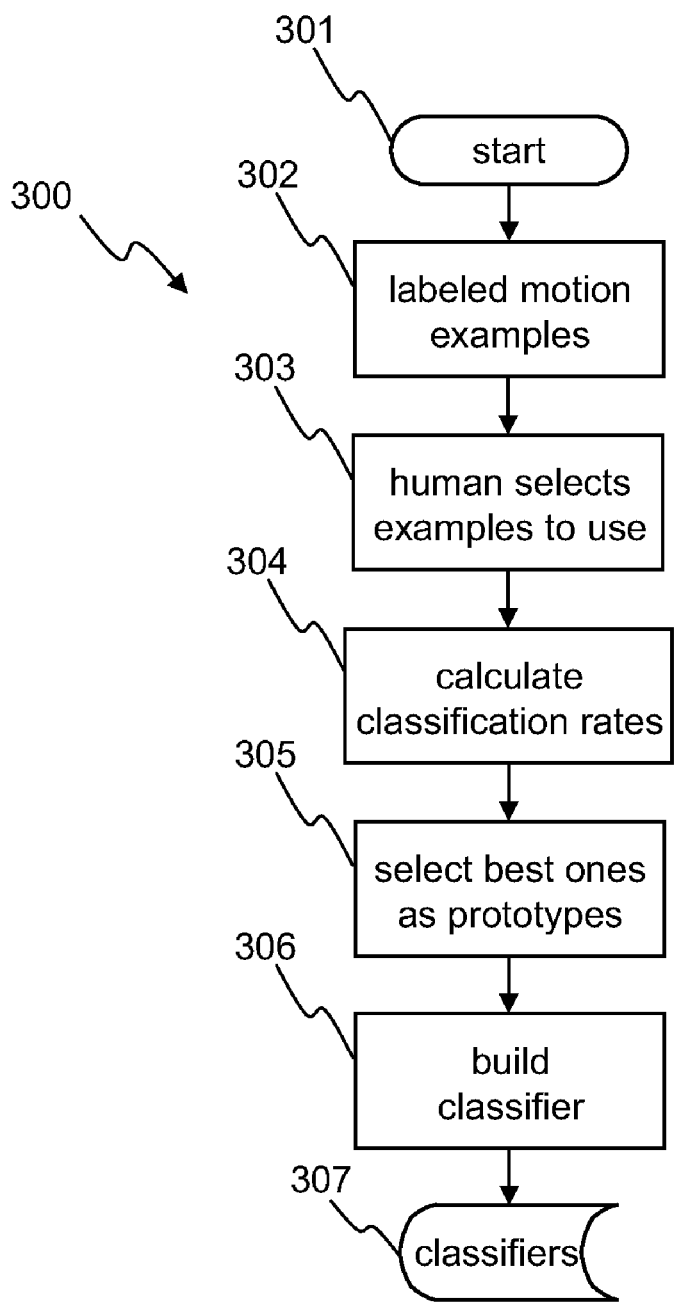
FIG. 3 shows a process of generating a new classifier in response to a set of labeled examples.

FIG. 3 shows the process 300 of generating a new classifier 307 from a set of labeled examples 302.

In particular, a human operator of ImMaker 303 selects which examples to use to build a classifier. If necessary, the motion examples are smoothed and then the classification rates are calculated for each example to each other example 304. The examples with the best classification rates are selected as the prototypes 305. The selected prototypes are then used to create the classifiers 305 that are stored out to disk or some other persistent storage 307 for future use.

Those skilled in the art would recognize that it is straightforward to include the functionality of ImMaker in the runtime library. This would allow the game players to generate their own classifiers from scratch within the context of playing the game. The only challenge is, from a game design point of view, how to integrate the classifier generation process into the game. One implementation by the inventors would be in the context of a Simon Says game. One player performs some motions that are used as prototypes to generate a new classifier. And then another player tries to perform the same motion such that the said classifier successfully recognizes the said motion as an instance of the same motion type as the prototypes.

Setup for Tuning a Classifier

Figure 6:
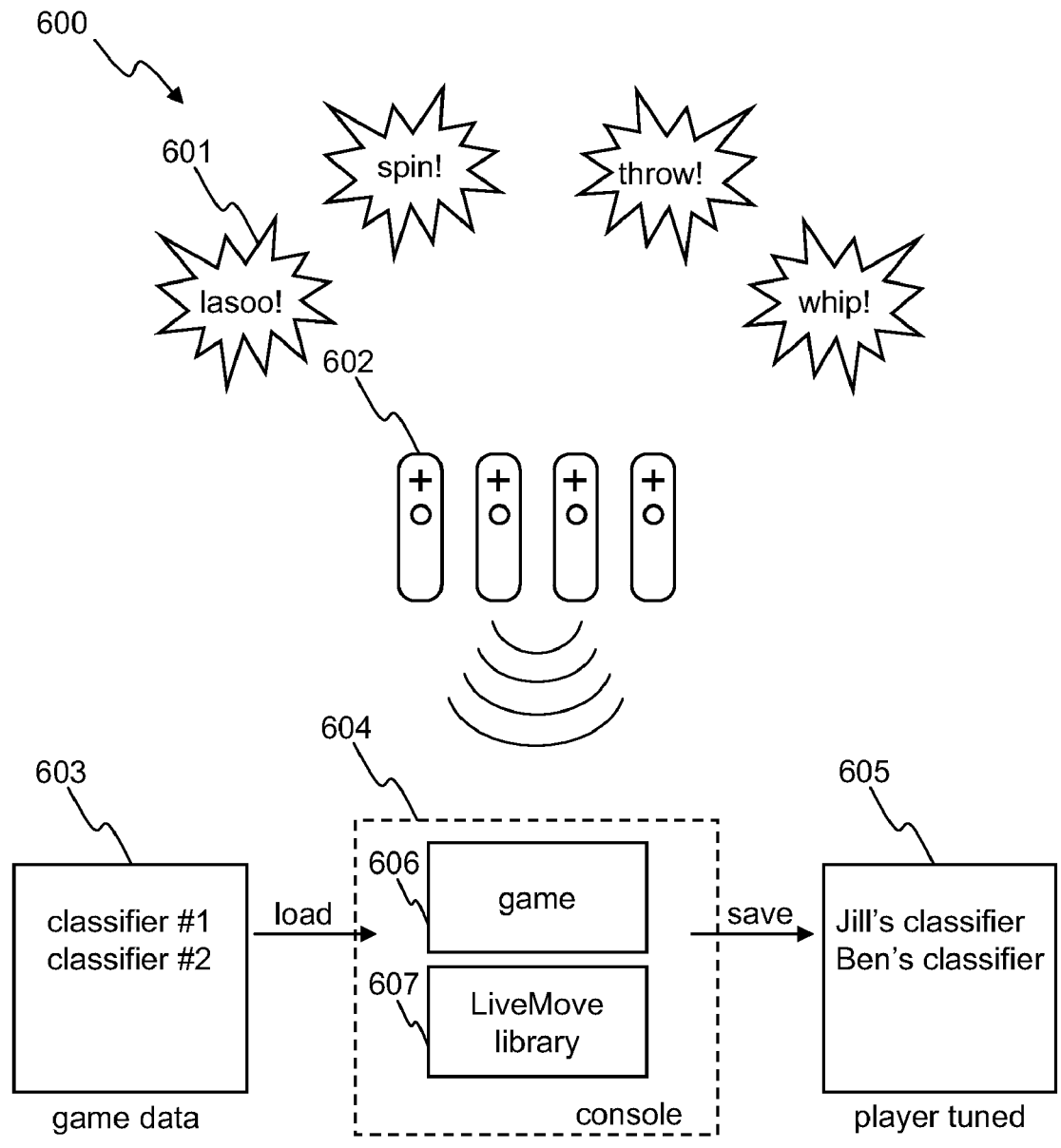
FIG. 6 shows a setup for tuning a classifier.

FIG. 6 shows the setup 600 for tuning a classifier.

The classifiers provided by the developer 603 are stored on disc, or can be downloaded over the network as downloadable content, and etc. These classifiers are then loaded by the game 606 that is running on the console 604. The players then use the wireless controllers 602 to perform their versions of the predefined moves 601. The runtime library 607 then uses the new example moves to tune the classifiers 603 to create versions tuned for individual users 605. The tuned classifiers 605 can then be saved out to a memory card or some other convenient storage medium.

Process for Tuning a Classifier

Figure 4:
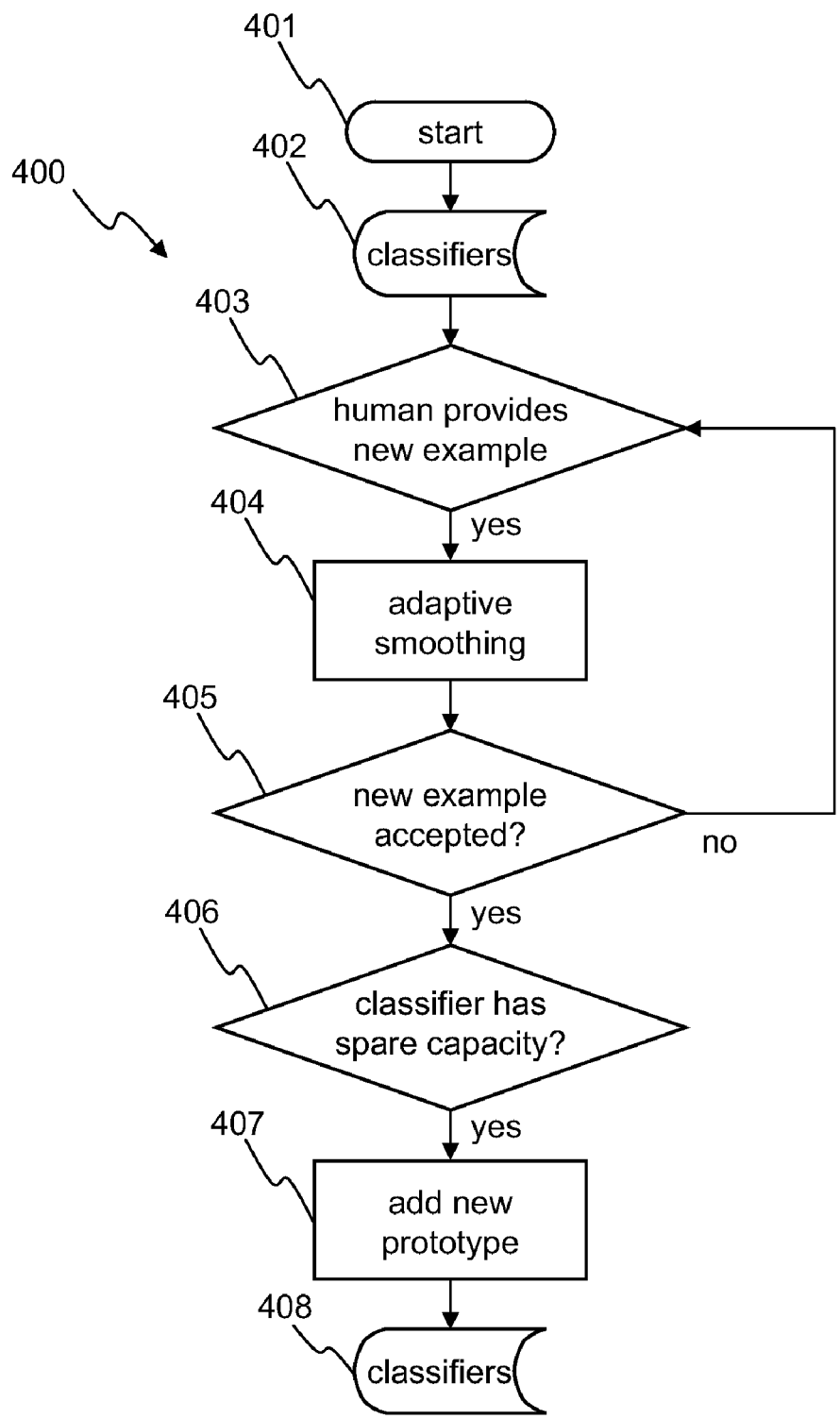
FIG. 4 shows a process of tuning a classifier.

FIG. 4 shows the process 400 of tuning a classifier.

The classifiers are initially loaded 402 by an application (e.g., a game). Next a human tunes the classifier by providing labeled examples 403 that represent his/her interpretation of the motions the classifier already knows how to classify. The human can continue to provide new examples until he/she is happy with the classification performance or the application decides enough tuning has been completed. The new examples provided by the human will typically be smoothed 404 before trying to classify it. If the classifier determines the new example is too far from any stored prototype 405, it will simply reject the new example and the human will have to provide an alternative. If the prototype is acceptable and the classifier has enough capacity 406 to store the new example, then the example may be stored in the classifier as a new prototype 407. The new classifier can then be saved out to a disk 408 or any other suitable storage media available locally or over the network.

Tuning could occur at development time to tweak an existing classifier. But at development time, the developer could just add the new motion prototypes to the previous set of prototypes and re-generate the classifier, as in FIG. 2. So the intended use of modifying a classifier is by the player after the game has been shipped. In particular, players who have purchased the game can add some of their own motion prototypes to the classifier. The inventors have discovered that this ability significantly boosts subsequent classification rates.

More generally, there is a chain of distribution between the developer and the end-user, and it might be desirable for one or more people in that chain (including, say,) to make modifications. For example, not intended to be limiting in any way, these could include parents with a security code, a value-added reseller, a consultant hired to tailor the game to a particular end-user, a retailer tailoring the game to a particular type of customer (such as expert tennis players versus small children).

The invention also obviously allows for some motions to be locked out, or to be released by the player achieving some skill level in the game.

System Elements

LiveMove

Nintendo will soon release a new games console called the Wii. One of the novel and interesting features of the Wii is the controller. In particular, the controller contains, among other things, accelerometers that can be used to record accelerations over time in three dimensions as a player moves the controller through space.

Game developers imagine many exciting new uses and games for the Wii and the associated controller. Many of those ideas revolve around being able to recognize which motions a player is performing. However, writing code to interpret the accelerometer data being relayed form the Wii controller is difficult. The problem is difficult because the same motion can be quite different when performed by different people, or even by the same person at different times. In addition the motion recording device might introduce measurement errors, or noise, that can make it harder to recognize a motion.

Game developers, using known techniques, have therefore struggled to bring their game ideas to market. The invention solves this problem by allowing game developers to create motion recognizers by simply providing examples of the motion to be recognized.

In a preferred embodiment, not intended to be limiting in any way, the invention is embodied in a commercially available product called LiveMove. LiveMove provides a video game with the ability to recognize any player's motions performed using the accelerometers in Nintendo's Wii remote controllers.

LiveMove Components libConsoleLM run-time library: Is a run-time library that is designed to be linked into the developer's game. Those skilled in the art would immediately recognize this as standard practice for using third party libraries.

libConsoleLM header files: Define the LiveMove API that the developer can use to insert calls to the libConsoleLM run-time library into their game source code. Those skilled in the art would immediately recognize this as standard practice for using third party libraries.

ImRecorder application: Is an application that runs on the Wii development kit that records data from the Wii controllers onto the hard drive of a standard PC (the host PC) that is connected to the development kit. Those skilled in the art would immediately recognize this as a standard approach to saving out data created on the Wii development kit.

ImMaker (Live Move classifier maker) application: Is an application that runs on a standard PC (the host PC) which is used to create motion prototypes and motion classifiers.

One embodiment of the invention includes the LiveMove run-time library called libConsoleLM, a classifier generation application called ImMaker (Live Move classifier maker) and a motion recorder application called ImRecorder. To use the invention, game developers will insert calls to the libConsoleLM run-time library API into their own code. Then the developer will compile and link the libConsoleLM with their game code (and any additional libraries they happen to be using). In contrast, a developer will only use ImMaker and ImRecorder at development time.

Methods of Operation

The steps that a game developer might typically follow to use LiveMove are listed below. In practice, any given set of developers may choose to skip some of the steps, repeat a step until some criteria are met, iterate over some subset of steps until some criteria are met, or perform some steps in a different order.

Motion Design Step: As part of the game design process, a game developer will typically decide upon a set of motions that they want the player to be able to perform in the game.

Motion Creation Step: Using ImRecorder, the Wii development kit and the controller, a game developer records a set of example raw motions for each motion that they want the player to be able to perform in the game. Recording the motions simply involves using the controller to perform a motion and choosing which motions to save on the host PC disk. The recorded motion signal is simply a sequence of numbers that represent the X, Y, Z accelerations of the Wii controller, that has an associated label to specify which motion it is an example of.

Processed Motion Creation Step: Processed motions are created by adaptively smoothing the raw motions. They are simply a compressed version of the raw motions that are convenient, easier and faster to work with. The processed motion can optionally contain the raw motion from which it was created. Raw and processed motions will sometimes be referred to simply as motions.

Motion Classifier Creation Step: Using ImMaker a game developer will select which set of labeled example motions to use to create a classifier. The set of selected examples is sometimes referred to as a training set. Once a classifier is created it is saved onto the disk of the host PC.

To generate a classifier each example motion is examined in turn. To each of these motions, the time warped distance is computed to each of the other motions. Where the time warped distance used is roughly the same as the one described in 1.

As each motion is examined in turn, if it is within some pre-specified distance of another motion, then it is classified as an instance of that other motion. For each motion, we therefore end up with a classification of all the other motions. By comparing the assigned classification with the actual class label, the classification rate can be determined, where the classification rate is a measure of the number of false positives versus the number of false negatives. All the motions can thus be ranked according to their respective classification rates. The top n classifiers are chosen to be prototypes for the class, where n is an integer number, e.g., 1, 2, 3, 4 . . . .

The generation of classifiers has a number of tunable parameters, such as the classification rate, that must be set in advance. Currently, the inventors have assigned these values, but those skilled in the art would quickly realize that expert users could easily be given access to these settings so that they can experiment for themselves.

libConsoleLM Incorporation Step: A game developer will insert the required API calls into their code by including the libConsoleLM header files and making calls to the functions contained therein, and link in the libConsoleLM run-time library. Those skilled in the art would immediately recognize this as standard practice for using third party libraries.

Game Shipping Step: As part of the usual process of shipping a game, a developer will store a compiled version of the game source code onto some media so that they accessible to the game during game play. Not intended to be limiting in any way, examples include saving the classifiers on DVD, memory cards, or servers accessible over some network.

The game will incorporate the libConsoleLM run-time library. The created classifier will also be distributed along with the game. From the developer's point of view, the classifier is one of the game's assets. Other more commonplace assets include sound files, texture maps, 3D models, etc. Those skilled in the art would immediately recognize this as standard practice for shipping games that depend on various assets.

Game Playing Step: When the player starts playing the game that they have purchased or otherwise acquired the game will execute the sequence of steps it has been programmed to execute in response to the player's actions. When the player starts the game, or reaches some otherwise convenient point in the game (such as a new level), the game will load in one of the previously generated classifiers.

As the player plays the game and performs motions with the Wii controller, the game supplies the motions to the libConsoleLM runtime library through the preprogrammed calls to the libConsoleLM runtime library. The libConsoleLM runtime library is also called by the game code to ask which motion the player has performed and the libConsoleLM run-time library will return, in real-time or close to real-time, a label indicating which motion, if any, the player's input data corresponds to. To make the determination the libConsoleLM runtime library uses its own internal logic and one of the classifiers it has access to.

In particular, time warping is used to compare the distance between the supplied motion and one of the stored prototypes. If a prototype is within its classification distance to the supplied motion, then that prototype is used to determine which class the supplied motion belongs to. Conflicts are typically resolved by majority vote, or some measure based upon the distance. If the supplied motion is not within the classification distance of any prototype, the supplied motion's class is said to be undetermined. That is, the supplied motion is deemed to not be an example of any known class.

The invention extends the known techniques described in 1 by inventing an incremental version. In particular, the incremental version can return the most likely classification before it has seen the entire motion signal. When only a small amount of the signal has been seen there maybe several likely candidates, but the inventors have discovered that it is often the case that, well before the end of the motion signal, there is only one likely remaining candidate. This is an important enabling invention for games where the latency in known approaches could result in annoying pauses.

In the preferred embodiment, there is a recommended tuning step a new player can perform before beginning to play the game in earnest. It is also recommended that the player repeat the tuning step whenever the recognition rates decline. For example, because the player is performing motions differently due to practice, tiredness, etc.

Whether the tuning step is undertaken is ultimately in the control of the game developer and the player. But the inventors have discovered that recognition rates are significantly boosted if a classifier can be modified to include prototypes from the player whose motions are to be recognized.

It is up to the game developer as to how they incorporate the tuning step into their game. The only constraint is that the classifier be provided with new labeled examples of known motion classes. A simple example of how the tuning step might be performed is to have the player follow instructions to perform a predetermined set of motions. That way the classifier knows to which class of motions the supplied motion is mean to belong.

Of course, all motion signals are again adaptively smoothed in order to compress them and make them easier to compare and manage.

If the candidate tuning example is too dissimilar from the known prototypes, it will typically be rejected and the player is expected to modify their behavior to more accurately perform the desired motion. In this way, the player is disallowed from generating de facto new recognizers. In particular, the ability to allow players to generate their own recognizers is only available for an additional licensing fee.

If the candidate tuning example is deemed suitable, it will be used to augment or replace one of the classifier's existing set of prototypes. Augmentation is preferable, but if the classifier has reached its capacity, for example, due to memory constraints, one of the existing prototypes must be discarded.

Additional details and advice on using LiveMove can be found in the incorporated disclosure, the LiveMove manual.

Generality of the Invention

This invention should be read in the most general possible form. This includes, without limitation, the following possibilities included within the scope of, or enabled by, the invention.

In one set of embodiments, extensions of the invention might allow players to generate their own motion recognizers from scratch. This might be performed by re-compiling the libConsoleLM runtime library to incorporate the code used in ImMaker to generate classifiers.

In one set of embodiments, extensions of the invention might enable a completely new class of games. For example, a team-based Simon Says game, that is, a synchronized motions game in which a team of players competes against another team of players, each with a controller in hand. The prototype motion is the captured data of all of the first teams' motion data over time. The opposing team has to mimic the motion. The contest would be like a sporting event: the synchronized motion Olympics.

The invention might be used to help people who are severely disabled but still have gross-motor control (but not fine-control). In particular, they could then type via the motion recognition interface. The ability to define your own motions means that they can settle on motions that are easy and comfortable for them to perform.

After reading this application, those skilled in the art would see the generality of this application. The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the foregoing description of embodiments.

TECHNICAL APPENDIX

This application includes the following technical appendix. This document forms a part of this disclosure, and is hereby incorporated by reference as if fully set forth herein.

The LiveMove user manual. The user manual is written for game developers who want to use LiveMove in their game. Among other things, it explains how to use the development tools to generate motion classifiers and describes the libConsoleLM run-time library API.

REFERENCES

This application includes the following references. Each of these documents forms a part of this disclosure, and is hereby incorporated by reference as if fully set forth herein.

1 E. Keogh and M. Pazzani, Derivative Dynamic Time Warping, in First SIAM International Conference on Data Mining, (Chicago, Ill., 2001).
2 Lawrence R. Rabiner, A Tutorial on Hidden Markov Models and Selected Applications in Speech Recognition. Proceedings of the IEEE, 77 (2), p. 257-286, February 1989.

We claim:

1. A system for controlling virtual objects in a video game display in a manner responsive to human motions, the system comprising:
at least one hand-held motion sensing device generating motion signals in response to the human motions;
a processing unit, loaded with a set of motion recognizers created in advance by at least one trained user, receiving the motion signals from the hand-held motion sensing device, and configured to:
compute motion recognition signals from some of the motion signals in reference to the motion recognizers;
form a training set including some or all of the motion signals;
tune one or more of the motion recognizers in the set of motion recognizers with the training set to modify a motion recognition behavior of the one or more tuned motion recognizers; and
use the motion recognition signals to control one or more virtual objects in the video game display.

2. The system as recited in claim 1, further comprising: the video game display showing a virtual interactive environment, wherein movements of at least one of the virtual objects in the video game display is responsive to one or more of the motion recognition signals.

3. The system as recited in claim 2, wherein the processing unit receives the motion recognizers in a portable storage medium, by downloading the motion recognizers via the Internet; or extracting the motion recognizers embedded in a video game.

4. The system as recited in claim 3, wherein the processing unit receives another set of the motion recognizers when the another set of the motion recognizers becomes available and relevant to the virtual environment.

5. The system as recited in claim 1, further comprising;
tuning one or more of the motion recognizers repeatedly once a predefined motion recognition level is below a certain value.

6. The system as recited in claim 1, wherein the processing unit includes a module configured to:
receive the motion signals wirelessly from the hand-held motion-sensing device; preprocess the motion signals by a filtering means; and segment the motion signals adaptively according to corresponding magnitudes of the underlying motion signals.

7. The system as recited in claim 6, wherein the module is configured further to:
Calculate classification rates for the motion signals; and
tune one or more of the motion recognizers by determining which of the motion signals to add as prototypes.

8. A method for controlling virtual objects in a video game display in a manner responsive to human motions, the method comprising:
loading a set of the motion recognizers that are created in advance by at least one trained user;
receiving motion signals from a hand-held motion-sensitive device, where the hand-held motion-sensitive device is being manipulated in response to a virtual environment being displayed on a display screen; and
forming a training set including some or all of the motion signals;
tuning one or more of the motion recognizers in the set of motion recognizers with the training set to modify a motion recognition behavior of the one or more tuned motion recognizers;
computing motion recognition signals from the motion signals using the set of motion recognizers so as to control one or more of the virtual objects in the virtual environment.

9. The method as recited in claim 8, further comprising:
Showing the virtual interactive environment in the video game display, movements of at least one of the virtual objects in the video game display is responsive to one or more of the motion recognition signals.

10. The method as recited in claim 9, wherein the motion recognizers are received in a portable storage medium, downloaded via the Internet, or embedded in a video game.

11. The method as recited in claim 8, further comprising receiving another set of the motion recognizers when the another set of the motion recognizers becomes available and relevant to the virtual environment.

12. The method as recited in claim 11, further comprising:
tuning one or more of the motion recognizers repeatedly once a predefined motion recognition level is below a certain value.

13. The method as recited in claim 8, wherein said receiving motion signals from the hand-held motion-sensitive device comprises receiving the motion signals wirelessly from the hand-held motion-sensitive device.

14. The method as recited in claim 13, wherein said computing motion recognition signals from the motion signals comprises:
preprocessing the motion signals by a filtering means; and
segmenting the motion signals adaptively according to corresponding magnitudes of the underlying motion signals.

15. The method as recited in claim 14, further comprising:
Calculating classification rates for the motion signals; and
tuning one or more of the motion recognizers by determining which of the motion signals to add as prototypes.

16. The method as recited in claim 15, further comprising:
calculating a classification distance of each of the motion signals to prototypes in the motion recognizers;
labeling the each of the motion signals as undetermined if the classification distance matches none of the prototypes;
labeling the each of the motion signals as a labeled motion associated with one of the prototypes if the classification distance matches only one prototype; or
labeling the each of the motion signals as a labeled motion associated with one of some of the prototypes if the classification distance matches some of the prototypes, where the one of some of the prototypes is determined by a smallest classification distance; and
adding one or more of the motion signals as prototypes to the one or more of the motion recognizers.

17. The method as recited in claim 16, wherein capacity for the new motion recognizers and substantially all other information needed to perform classification are created automatically and directly from the training set.

18. A method for controlling virtual objects in a video game display in a manner responsive to human motions, the method comprising:
loading a set of the motion recognizers that are created in advance by at least one trained user;
receiving motion signals from a hand-held motion-sensitive device, where an end user is manipulating the hand-held motion-sensitive device in response to a virtual environment being displayed on a display screen; and
forming a training set including some or all of the motion signals;
tuning one or more of the motion recognizers in the set of motion recognizers with the training set to modify a motion recognition behavior of the one or more tuned motion recognizers;
computing motion recognition signals for some or all of the motion signals using the set of motion recognizers to determine what type of translations and/or rotations shall be applied to one or more objects in the virtual environment.

19. The method as recited in claim 18, further comprising:
showing the virtual interactive environment on a video game display, movements of at least one of the virtual objects in the video game display is responsive to one or more of the motion recognition signals.

20. The method as recited in claim 19, wherein the motion recognizers are received in a portable storage medium, downloaded via the Internet, or embedded in a video game.

21. The method as recited in claim 18, further comprising receiving another set of the motion recognizers when the another set of the motion recognizers becomes available and relevant to the virtual environment.

22. The method as recited in claim 21, further comprising tuning one or more of the motion recognizers repeatedly once a predefined motion recognition level is below a certain value.

23. The method as recited in claim 18, wherein said receiving motion signals from the hand-held motion-sensitive device comprises receiving the motion signals wirelessly from the hand-held motion sensitive device.

24. The method as recited in claim 23, wherein said computing motion recognition signals from the motion signals comprises:
preprocessing the motion signals by a filtering means; and
segmenting the motion signals adaptively according to corresponding magnitudes of the underlying motion signals.

25. The method as recited in claim 24, further comprising:
Calculating classification rates for the motion signals; and
tuning one or more of the motion recognizers by determining which of the motion signals to add as prototypes.

26. The method as recited in claim 25, further comprising:
calculating a classification distance of each of the motion signals to prototypes in the motion recognizers;

labeling the each of the motion signals as undetermined if the classification distance matches none of the prototypes;

labeling the each of the motion signals as a labeled motion associated with one of the prototypes if the classification distance matches only one prototype; or labeling the each of the motion signals as a labeled motion associated with one of some of the prototypes if the classification distance matches some of the prototypes, where the one of some of the prototypes is determined by a smallest classification distance; and adding one or more of the motion signals as prototypes to the one or more of the motion recognizers.

27. The method as recited in claim 26, wherein capacity for the new motion recognizers and substantially all other information needed to perform classification are created automatically and directly from the training set.

28. A method for controlling virtual objects in a video game display in a manner responsive to human motions, the method comprising:

loading at least two motion recognizers in a processing unit, the two motion recognizers being hierarchically related such that both are instances of a same type of motion, each of the motion recognizers including an undefined class such that a misinterpretation of a given move is explicitly disallowed, each of the motion recognizers created in advance by at least one trained user;

receiving a set of motion signals from a hand-held motion-sensitive device, where the hand-held motion-sensitive device is manipulated in response to a virtual environment being displayed on a display screen;

forming a training set including some or all of the motion signals;

tuning one or more of the motion recognizers in the set of motion recognizers with the training set to modify a motion recognition behavior of the one or more tuned motion recognizers;

wherein the processing unit is configured to compute a motion recognition label for each of the set of motion signals in response to the motion recognizers, the motion recognition label is used to select a predetermined action that determines what type of translations and/or rotations to apply to one or more objects in the display.

29. The method as recited in claim 28, further comprising:
Showing the virtual interactive environment on the display screen, wherein movements of at least one of the virtual objects in the video game display is responsive to one or more of the motion recognition labels.

30. The method as recited in claim 29, wherein the motion recognizers are received in a portable storage medium, downloaded via the Internet, or embedded in a video game.

31. The method as recited in claim 28, further comprising receiving additional motion recognizers when the additional motion recognizers becomes available and relevant to the virtual environment.

32. The method as recited in claim 28, further comprising:
tuning one or more of the motion recognizers repeatedly once a predefined motion recognition level is below a certain value.

33. The method as recited in claim 28, wherein said receiving a set of motion signals from the hand-held motion-sensitive device comprises receiving the set of motion signals wirelessly from the hand-held motion sensitive device.

34. The method as recited in claim 33, further comprising:
Preprocessing the set of motion signals by a filtering means; and
Segmenting the set of motion signals adaptively according to corresponding magnitudes of the set of underlying motion signals.

35. The method as recited in claim 34, further comprising:
Calculating classification rates for the set of motion signals; and
tuning each of the motion recognizers by determining which of the set of motion signals to add as prototypes.

36. The method as recited in claim 35, further comprising:
calculating a classification distance of each of the set of motion signals to prototypes in the motion recognizers;
labeling the each of the set of motion signals as undetermined if the classification distance matches none of the prototypes;
labeling the each of the set of motion signals as a labeled motion associated with one of the prototypes if the classification distance matches only one prototype; or
labeling the each of the set of motion signals as a labeled motion associated with one of some of the prototypes if the classification distance matches some of the prototypes, where the one of some of the prototypes is determined by a smallest classification distance; and
adding one or more of the set of motion signals as prototypes to the one or more of the motion recognizers.

* * * * *